(12) United States Patent
Abe

(10) Patent No.: US 10,618,569 B2
(45) Date of Patent: Apr. 14, 2020

(54) STEERING SUPPORT MEMBER STRUCTURE

(71) Applicant: CALSONIC KANSEI CORPORATION, Saitama (JP)

(72) Inventor: Masato Abe, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 1 day.

(21) Appl. No.: 15/561,186

(22) PCT Filed: Mar. 18, 2016

(86) PCT No.: PCT/JP2016/058757
§ 371 (c)(1),
(2) Date: Sep. 25, 2017

(87) PCT Pub. No.: WO2016/152793
PCT Pub. Date: Sep. 29, 2016

(65) Prior Publication Data
US 2018/0050730 A1    Feb. 22, 2018

(30) Foreign Application Priority Data

Mar. 26, 2015   (JP) .................. 2015-065042

(51) Int. Cl.
*B62D 25/14*     (2006.01)
*B62D 1/16*      (2006.01)
*B62D 27/00*     (2006.01)

(52) U.S. Cl.
CPC ............. *B62D 25/145* (2013.01); *B62D 1/16* (2013.01); *B62D 27/00* (2013.01)

(58) Field of Classification Search
CPC ................. B62D 25/145; B62D 1/16
(Continued)

(56) References Cited

U.S. PATENT DOCUMENTS

| 5,120,106 A | 6/1992 | Sakurai et al. |
| 5,931,520 A | 8/1999 | Seksaria et al. |

(Continued)

FOREIGN PATENT DOCUMENTS

| CN | 103987617 A | 12/2011 |
| CN | 102381360 A | 3/2012 |

(Continued)

OTHER PUBLICATIONS

International Search Report mailed by Japan Patent Office dated Jun. 7, 2016 in PCT Application No. PCT/JP2016/058757.

(Continued)

*Primary Examiner* — Jason S Morrow
(74) *Attorney, Agent, or Firm* — Knobbe, Martens, Olson & Bear LLP

(57) ABSTRACT

The steering support member is disposed in a front portion of a vehicle cabin to support the steering column. The steering support member includes a steering support member body that extends in a vehicle width direction, and side brackets that fix both ends of the steering support member body to a vehicle body. The steering support member body is disposed above a gravity center position of the steering column to fix the gravity center position or a position in a vicinity of the gravity center position. At least the side bracket closer to the steering column includes a front-and-rear fixing portion that fixes the steering support member to the vehicle body in a vehicle front-and-rear direction.

1 Claim, 4 Drawing Sheets

(58) Field of Classification Search
USPC .................................................. 296/193.02
See application file for complete search history.

(56) References Cited

U.S. PATENT DOCUMENTS

| | | | | |
|---|---|---|---|---|
| 2002/0167199 | A1* | 11/2002 | Kim | B62D 25/145 296/203.02 |
| 2003/0034672 | A1* | 2/2003 | Nagy | B62D 25/145 296/203.02 |
| 2007/0262613 | A1* | 11/2007 | Meier | B62D 25/145 296/192 |
| 2007/0295453 | A1* | 12/2007 | Koelman | B29C 66/54 156/331.8 |
| 2012/0049573 | A1 | 3/2012 | Atsumi | |
| 2014/0049075 | A1* | 2/2014 | Kasper | B62D 25/145 296/205 |
| 2014/0333094 | A1 | 11/2014 | Matsushita et al. | |
| 2015/0344080 | A1* | 12/2015 | Davos | B62D 29/001 296/205 |
| 2016/0052562 | A1* | 2/2016 | Yoshida | B62D 25/14 296/72 |
| 2018/0001857 | A1* | 1/2018 | Tanaka | B62D 1/187 |

FOREIGN PATENT DOCUMENTS

| | | |
|---|---|---|
| CN | 102887174 A | 1/2013 |
| CN | 104071233 | 6/2016 |
| DE | 102012212710 A1 | 1/2013 |
| FR | 2850945 A1 | 8/2004 |
| JP | S62-68172 A | 3/1987 |
| JP | 2003-137105 | 5/2003 |
| JP | 2003-137106 A | 5/2003 |
| JP | 2005-343371 A | 12/2005 |
| JP | 2013-023045 A | 2/2013 |

OTHER PUBLICATIONS

Office Action dated Dec. 11, 2018 in Chinese Application No. 201680015767.9, concise translation only, 2 pgs.

* cited by examiner

STEERING SUPPORT MEMBER STRUCTURE

CROSS-REFERENCE TO RELATED APPLICATIONS

This application is the U.S. National Phase under 35 U.S.C. § 371 of International Application No. PCT/JP2016/058757, filed on Mar. 18, 2016, which claims priority to Japanese Patent Application No. 2015-065042, filed on Mar. 26, 2015. The entire contents of these applications are incorporated herein by reference.

TECHNICAL FIELD

The present invention relates to a steering support member structure.

BACKGROUND ART

A vehicle such as an automobile includes an instrument panel disposed in a front portion of a vehicle cabin. Inside the instrument panel, a steering support member that supports a steering column is disposed. A structure of the steering support member (the steering support member structure) includes a steering support member body that extends in a vehicle width direction, and side brackets that fix both ends of the steering support member body to a vehicle body (see Patent Literature 1: JP 2013-23045 A, for example).

In the steering support member structure disclosed in Patent Literature 1, the side brackets are provided in a vicinity of edges on a vehicle cabin side. The edges are located in a vehicle front portion forward of door openings in the vehicle body. In addition, the side brackets are fixed to the vehicle body in the vehicle width direction.

SUMMARY

However, the above steering support member structure has a following problem.

Specifically, the vibration of the steering column generates a rotational moment which is applied to the steering support member. Accordingly, the steering support member needs to have high rigidity. However, the high rigidity of the steering support member undesirably increases the weight thereof.

Therefore, a principal object of the present invention is to solve the above problem.

To solve the above problem, the present invention provides a steering support member structure including a steering support member that is disposed in a front portion of a vehicle cabin to support a steering column. The steering support member includes a steering support member body that extends in a vehicle width direction, and side brackets that fix both ends of the steering support member body to a vehicle body. The steering support member body is disposed above a gravity center position (a position of the center of gravity) of the steering column to fix the gravity center position or a position in a vicinity of the gravity center position, and at least the side bracket closer to the steering column includes a front-and-rear fixing portion that fixes the steering support member to the vehicle body in a vehicle front-and-rear direction.

DETAILED DESCRIPTION

A present embodiment will be described below in detail with reference to the drawings.

FIGS. 1 to 5 illustrate the embodiment.

First Embodiment

Configuration

Hereinafter, a configuration of the embodiment is described.

Figure 1:
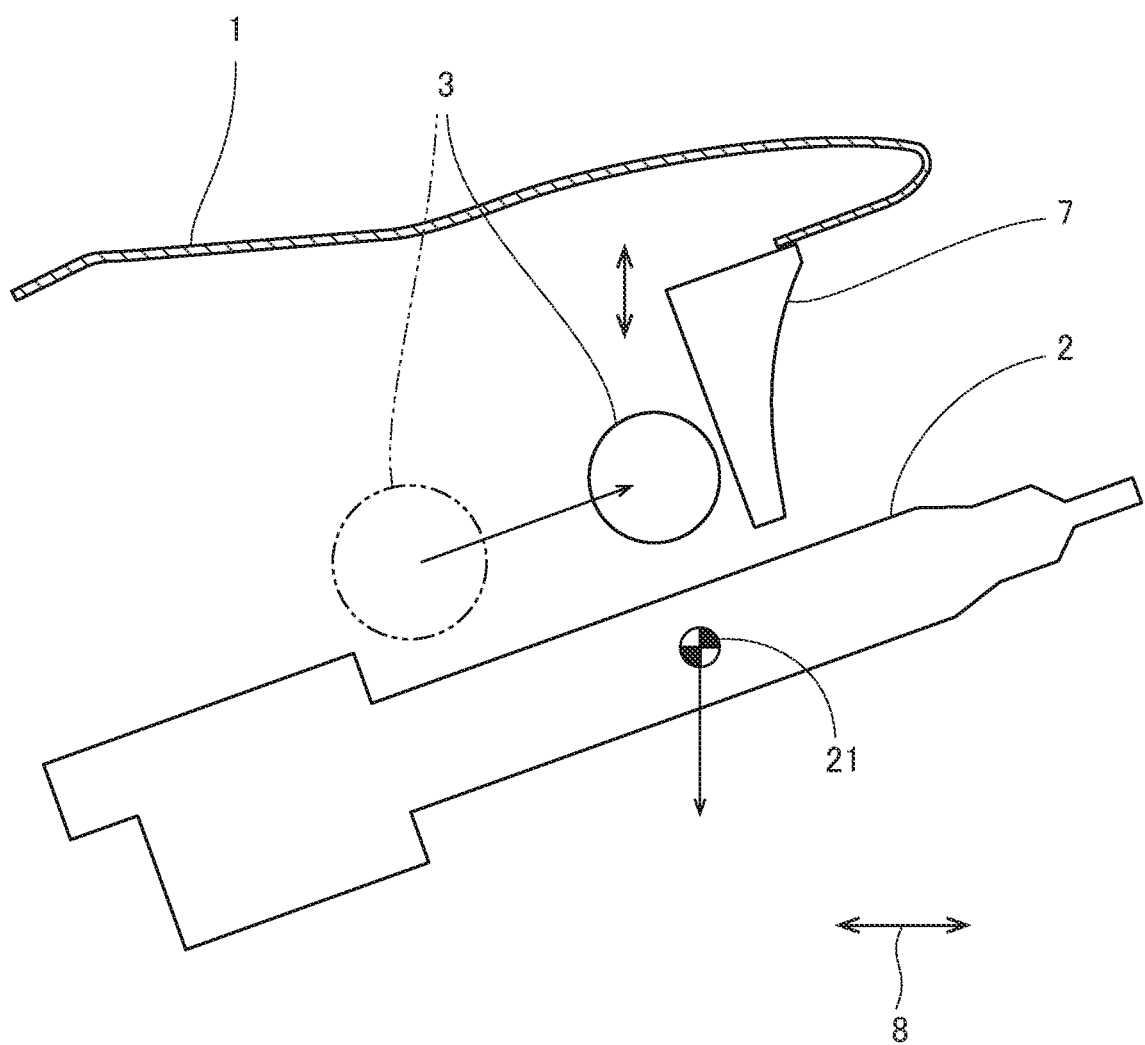
FIG. 1 is a vertical cross-sectional view of an instrument panel according to the present embodiment.
Figure 2:
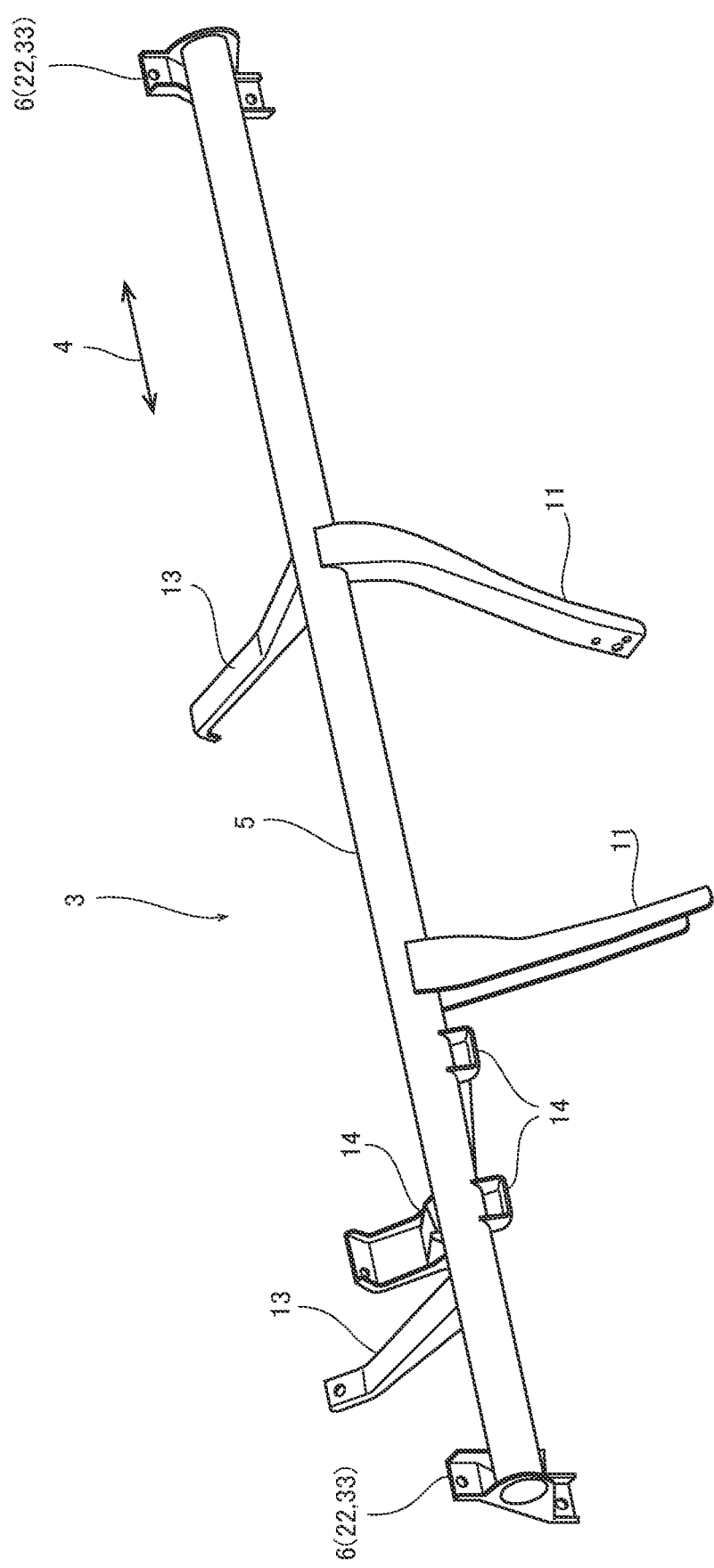
FIG. 2 is a perspective view of a steering support member of FIG. 1.

As shown in FIG. 1, a vehicle such as an automobile includes an instrument panel 1 disposed in a front portion of a vehicle cabin. Inside the instrument panel 1, a steering support member 3 that supports a steering column 2 is disposed. As shown in FIG. 2, a structure of the steering support member 3 (a steering support member structure) includes a steering support member body 5 and side brackets 6. The steering support member body 5 extends in a vehicle width direction 4. The side brackets 6 fix both ends of the steering support member body 5 to a vehicle body.

Here, as shown in FIG. 1, an instrumental device 7 (a meter) is disposed inside the instrument panel 1. The steering column 2 extends substantially in a vehicle front-and-rear direction 8.

Further, as shown in FIG. 2, in this embodiment, the steering support member body 5 extends over the entire width of the vehicle width direction. The steering support member body 5 is a round pipe made of metal. The steering support member body 5 includes stays 11, post brackets 13, column brackets 14, and so forth. The stays 11 are disposed such that a middle portion of the steering support member body 5 supports a floor panel of the vehicle. The post brackets 13 are disposed such that the middle portion of the steering support member body 5 supports a front wall 12 (see FIG. 3) of the vehicle cabin. The column brackets 14 are used to mount the steering column 2.

Figure 3:
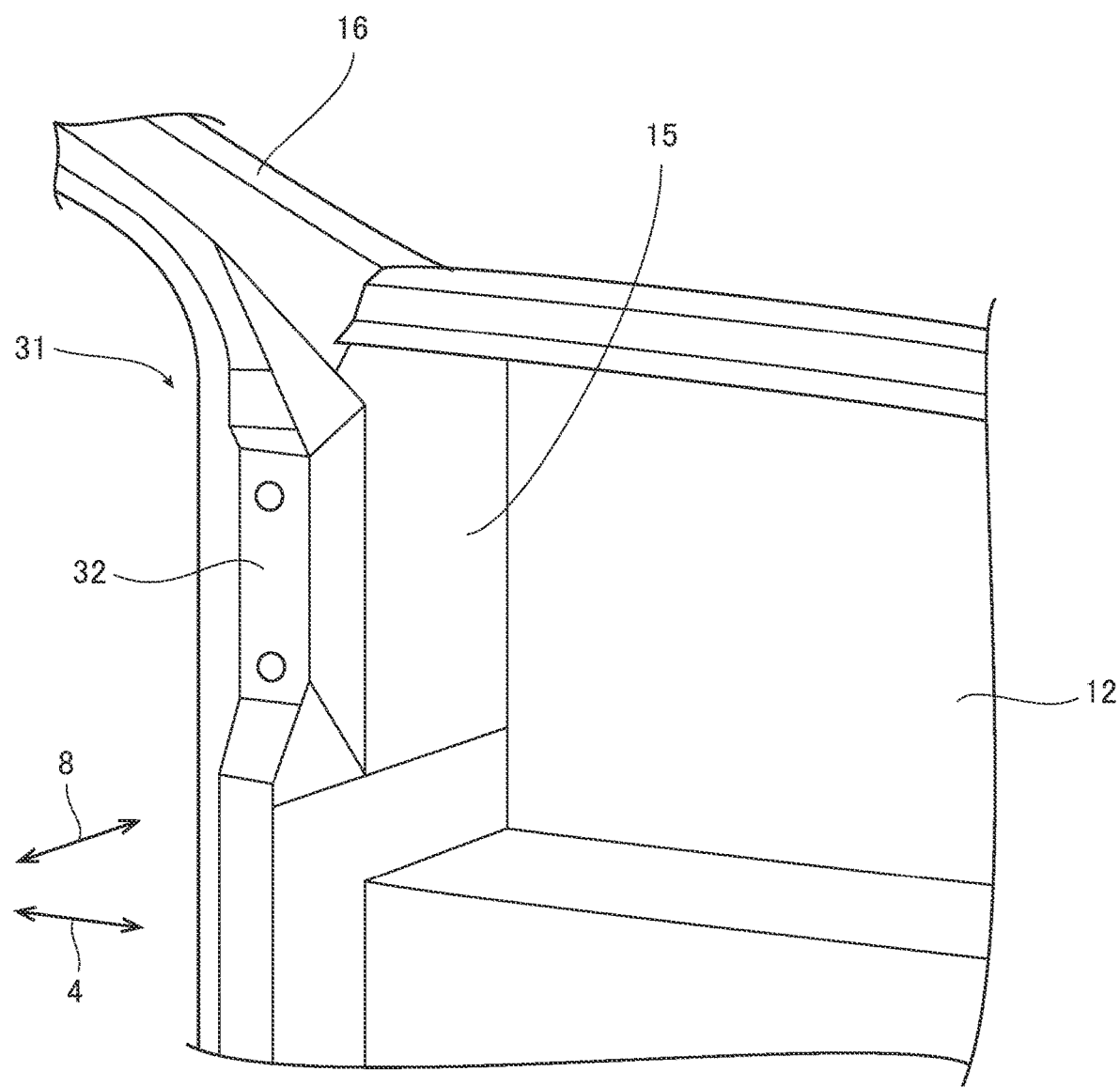
FIG. 3 is a perspective view of a door opening provided in a front portion of a vehicle cabin.

As shown in FIG. 3, the front portion of the vehicle cabin includes the front wall 12 and side walls 15. Above the front wall 12 and the side walls 15, pillars 16 are disposed to divide a windshield and side windows.

In addition to the basic configuration described above, the embodiment includes following components.

Figure 4:
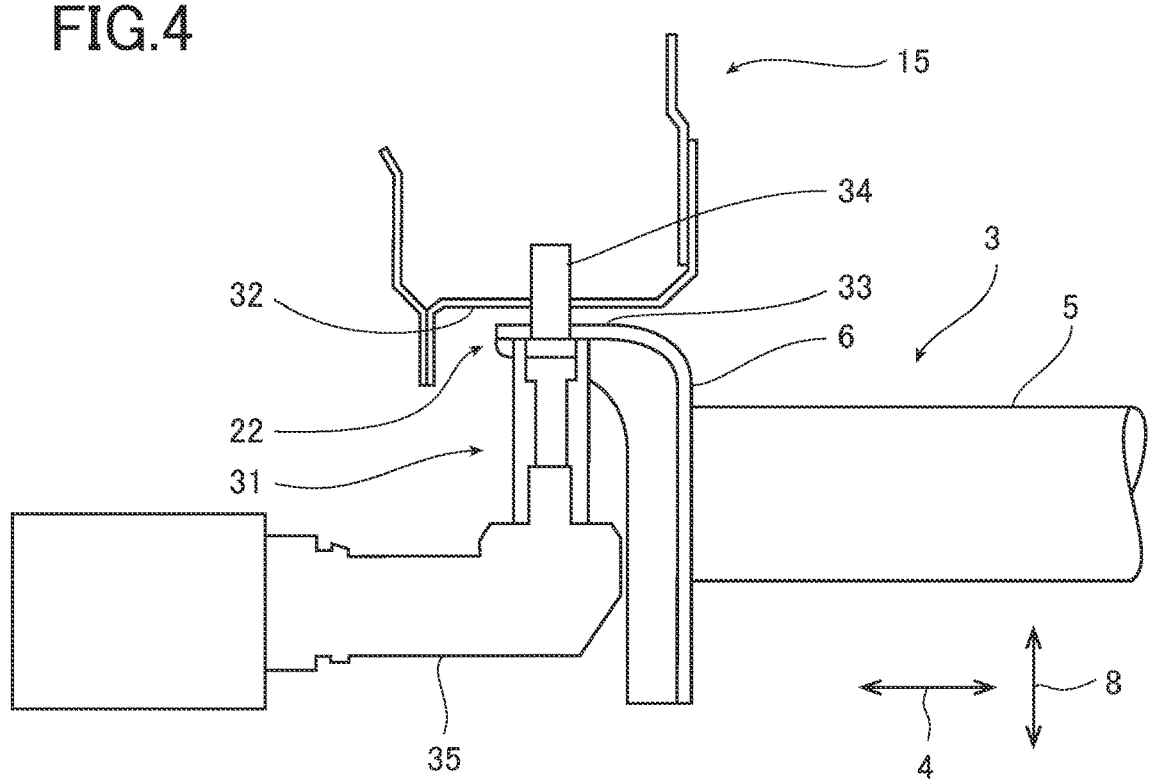
FIG. 4 is a plan view of a front-and-rear fixing portion.

(1) As shown in FIG. 1 (also see FIG. 2), the steering support member body 5 (the steering support member 3) is disposed above a position 21 of the center of gravity (referred to as a gravity center position 21 hereinafter) of the steering column 2 to fix the gravity center position 21 and a position in a vicinity of the gravity center position 21 (by means of the column brackets 14). Then, as shown in FIG. 4, at least the side bracket 6 closer to the steering column 2 includes a front-and-rear fixing portion 22 that fixes the steering support member 3 to the vehicle body in the vehicle front-and-rear direction 8. To dispose the steering support member body 5 above the gravity center position 21 of the steering column 2 means that assuming there is a virtual line extending vertically upward from the gravity center position 21, the virtual line is located within the area of the cross section of the steering support member body 5. In this embodiment, the virtual line is located within a diameter of the pipe of the steering support member body 5.

Here, the gravity center position 21 of the steering column 2 is a gravity center position of a portion of the steering column 2 that is located in the vehicle cabin. Specifically, the portion of the steering column 2 located in the vehicle cabin is a portion between a steering wheel and an intermediate shaft (i.e. between the steering wheel and a first universal joint located forward of the steering wheel in the vehicle front- and rear direction), and the steering column 2 includes the steering wheel. In a case of a steering-by-wire system, only the portion located in the vehicle cabin is provided since the intermediate shaft is not used in such system.

(2) Each of the front-and-rear fixing portions 22 includes a door flange abutting fixing surface 33 that abuts an opening flange 32 of respective door openings 31 in the vehicle body. The door flange abutting fixing surface 33 is fixed to the opening flange 32 in the vehicle front-and-rear direction 8 with fasteners 34 such as bolts.

The door openings 31 are openings for mounting front doors. Each of the door openings includes the opening flange 32. The opening flange 32 of the respective door openings 31 is an edge surface corresponding to the thickness of the front door. The door flange abutting fixing surface 33 is a surface extending substantially in the vehicle width direction and in a vertical direction. The door flange abutting fixing surface 33 is capable of abutting a front portion (a front edge) of the opening flange 32. In this embodiment, the door flange abutting fixing surface 33 includes screw holes provided in above and below the steering support member body 5. The fasteners 34 are fastened by a tool such as an L-shaped electric tool 35 which accesses from the outside of the vehicle body through one of the door openings 31.

Operation and Effect

According to this embodiment, following operations and effects are obtained.

Operation and Effect I

The steering support member 3 is disposed above the gravity center position 21 of the steering column 2, and the steering column 2 is fixed at the gravity center position 21. Thereby, the rotational moment, which is applied to the steering support member 3 due to the vibration of the steering column 2, can be reduced. As a result, the rigidity required to the steering support member 3 against twisting and deflection is reduced. In addition, the weight reduction (thinning and/or reduction in diameter) of the steering support member 3 can be achieved.

In addition, by fixing the steering column 2 at the gravity center position 21, the direction of the deflection of the steering support member 3 caused by the vibration of the steering column 2 corresponds to one direction, specifically the substantially vertical direction. Thereby, the deflection of the steering support member 3 in the vehicle front-and-rear direction 8 is substantially eliminated, and accordingly, the vibration of the steering transmitted to an occupant can be minimized.

Figure 5:
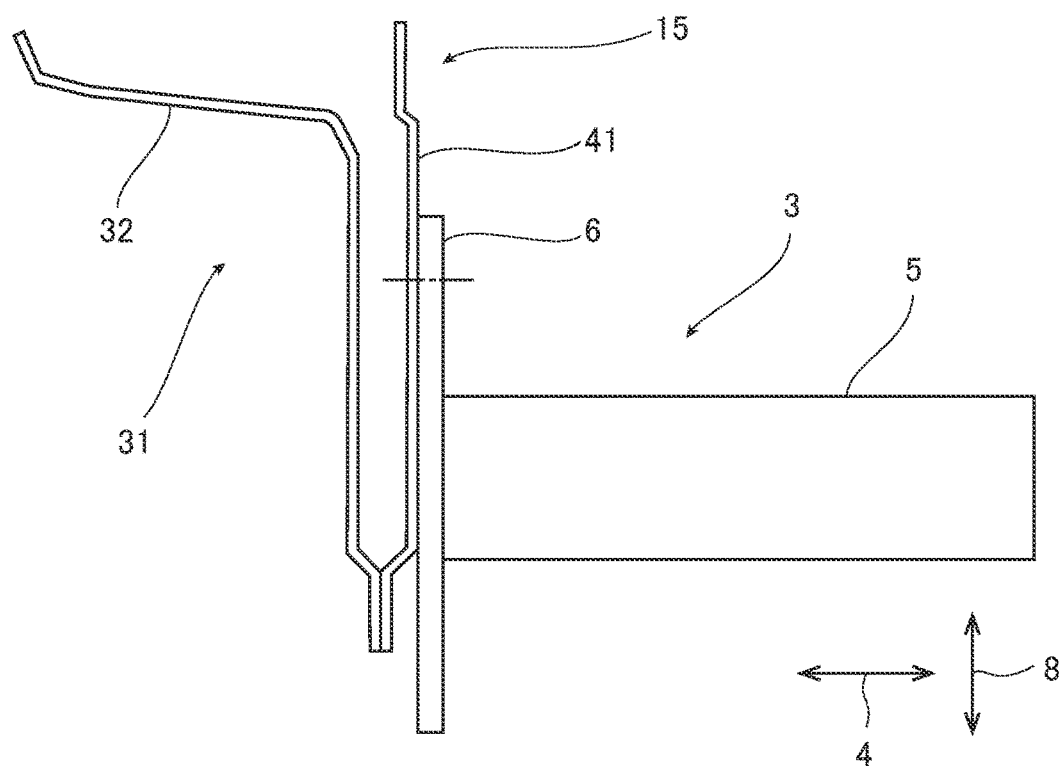
FIG. 5 is a plan view of a structure that has no front-and-rear fixing portion.

When the steering column 2 is fixed at the center gravity position 21, the position of the steering support member 3 greatly moves rearward in the vehicle front-and-rear direction 8 from the existing position (see the virtual line in FIG. 1). As a result, the position of the side brackets 6 extends rearward from the front edge portions of the door openings 31 in the vehicle body. Thereby, it is impossible to fix the side brackets 6 from the vehicle width direction 4 as conventionally made. If the side brackets 6 are to be forcibly fixed in the vehicle width direction 4, it is necessary to provide a projecting portion 41 that largely extends rearward from the door openings 31 to fix the side brackets 6 as shown in FIG. 5, which is not practical.

Considering above, at least the side bracket 6 closer to the steering column 2 includes the front-and-rear fixing portion 22 (the fixing surface) that fixes the steering support member 3 to the vehicle body in the vehicle front-and-rear direction 8. Accordingly, it is possible to fix the steering support member 3 to the vehicle body without any difficulty even when the position of the steering support member 3 is greatly moved rearward to fix the steering column 2 at the gravity center position 21.

Operation and Effect II

Each of the front-and-rear fixing portions 22 of the side brackets 6 includes the door flange abutting fixing surface 33. Thereby, it is possible to reduce the extension of the side brackets 6 to the door openings 31 and accordingly to fix the front-and-rear fixing portions 22 of the side brackets 6 in the vehicle front-and-rear direction 8 without any difficulty. In addition, it is also possible to prevent deterioration in appearance of the side brackets 6 by making the front-and-rear fixing portions 22 of the side brackets 6 less conspicuous. Further, the front-and-rear fixing portions 22 of the side brackets 6 are fixed to the opening flanges 32 of the door openings 31, respectively. The steering support member 3 is disposed above the gravity center position 21 of the steering column 2, and the steering column 2 is fixed at the gravity center position 21. Therefore, the rotational moment applied to the steering support member 3 can be reduced. As a result, each of the opening flanges 32 of the door openings 31 can include an attaching portion without increasing the rigidity of the attaching portion.

While the embodiments have been described in detail with reference to the drawings, the embodiments are only illustrative and exemplary of the invention. Accordingly, the invention is not limited to the configurations of the embodiments. It will be appreciated that any design change and the like that do not depart from the gist should be included in the invention. It is to be understood that, when multiple configurations are incorporated in each of the embodiments, for example, possible combinations of these configurations are included in the invention without any particular description. It should further be understood that, when multiple embodiments and modifications are disclosed as those of the invention, any possible combinations of configurations among these embodiments and modifications are considered to be included in the invention without any particular description. Moreover, configurations disclosed in the drawings are naturally considered to be included in the invention without any particular description. Further, the term "and/or the like (such as)" is used to indicate that any equivalent is also included. Also, when such a term as "substantially", "about", or "approximately" is used, this means that a value or the like within a range or accuracy which is reasonably acceptable is also included.

REFERENCE SIGNS LIST

2 Steering Column
3 Steering Support Member
4 Vehicle Width direction

5 Steering Support Member Body
6 Side Brackets
8 Vehicle Front-and-Rear Direction
21 Gravity Center Position
22 Front-and-Rear Fixing Portions
31 Door Openings
32 Opening Flanges
33 Door Flange Abutting Fixing Surface
34 Fasteners

What is claimed is:

1. A steering support member structure, comprising a steering support member that is disposed in a front portion of a vehicle cabin to support a steering column, the steering support member comprising:
 a single steering support member body configured to extend over an entire width of the front portion of the vehicle cabin in a vehicle width direction that is perpendicular to a vehicle front-and-rear direction; and
 side brackets configured to fix both ends of the single steering support member body to a vehicle body,
 wherein the single steering support member body is disposed above a center of gravity of the steering column to fix the center of gravity or a position in a vicinity of the center of gravity,
 wherein a virtual line extending vertically upward from the center of gravity of the steering column is located within a cross-sectional area of the single steering support member body,
 wherein a side bracket closer to the steering column comprises:
  a member fixing portion that is fixed to an end of the single steering support member body and extends perpendicular to an axial direction of the steering support member, and
  a front-and-rear fixing portion that fixes the steering support member to the vehicle body in the vehicle front-and-rear direction, and bends outward in the vehicle width direction from a front end of the member fixing portion in the vehicle front-and-rear direction,
 wherein the side bracket closer to the steering column has an L-shape formed by the member fixing portion and the front-and-rear fixing portion,
 wherein the front-and-rear fixing portion abuts and is fixed to an opening flange of a door opening by a fastener, and
 wherein a head of the fastener is located forward of the steering support member body in the vehicle front-and-rear direction.

* * * * *